United States Patent [19]

Kuan

[11] Patent Number: 5,245,548
[45] Date of Patent: Sep. 14, 1993

[54] GRAIN CARGO AUTOMATIC METERING AND DISPENSING SYSTEM

[76] Inventor: Ching Fu Kuan, No. 26-147, Ta-Pu Lee, San Hsia, Taipei, Taiwan

[21] Appl. No.: 613,202

[22] Filed: Nov. 14, 1990

[30] Foreign Application Priority Data

Mar. 16, 1990 [EP] European Pat. Off. ........ 90104948.6

[51] Int. Cl.$^5$ .................. G06F 15/46; G05D 11/02
[52] U.S. Cl. ........................................ 364/479; 222/52; 364/567; 366/152
[58] Field of Search ............. 364/478, 479, 502, 567; 222/52, 55, 57, 58, 71, 77, 135; 366/18, 141, 152, 160, 191; 340/825.69

[56] References Cited

U.S. PATENT DOCUMENTS

| | | | |
|---|---|---|---|
| 4,527,245 | 7/1985 | Axelson, Jr. et al. | 364/479 |
| 4,581,704 | 4/1986 | Mitsukawa | 364/479 |
| 4,850,703 | 7/1989 | Hanaoka et al. | 364/479 |

Primary Examiner—Joseph Ruggiero
Attorney, Agent, or Firm—Bucknam and Archer

[57] ABSTRACT

A grain cargo automatic metering and dispensing system, which utilizes microcomputers to register the data of the ingredients and quantity of a prescribed formula and simultaneously control the storage and the feeding of prescribed materials, the operation of a mechanical hand to take up and let off empty containers, the operation of a weighing system and the operation of a conveyer system. Therefore, material dispensing operation can be accurately and efficiently executed through computer control to eliminate any possible human error.

7 Claims, 7 Drawing Sheets

GRAIN CARGO AUTOMATIC METERING AND DISPENSING SYSTEM

BACKGROUND OF THE INVENTION

The present invention is related to automatic metering and dispensing systems and more particularly to a grained or powdered material metering and dispensing system which is computer-controlled to execute the operation accurately and rapidly and can eliminate any possible human error in material dispensing according to a prescription.

Automatic machinery has been commonly used to replace manpower in manufacturing operations, which improves greatly manufacturing capacity and makes it possible to standardize the quality. In recent years, mircoprocessors have been greatly improved in operation. Therefore, people are continuously trying to utilize microprocessors in every industry to reduce manpower consumption and eliminate any possible human error in quality control.

In regular chemical reprocessing factories, it is an important job to dispense grained or powdered materials according to a prescription. For a dispensing work only those experienced persons can do it accurately and rapidly. However, because dust may fly about and obstruct one's respiratory system during dispensing work, few people like to do the job. Further, manpower operation, makes it difficult to maintain constant quality. It is therefore, and object of the present inventor to provide a grain cargo automatic metering and dispensing system to eliminate the aforesaid problem.

BRIEF DESCRIPTION OF THE DRAWINGS

The present invention will now be described by way of example with reference made to the annexed drawings, in which.

DETAILED DESCRIPTION OF THE INVENTION

Figure 1A:
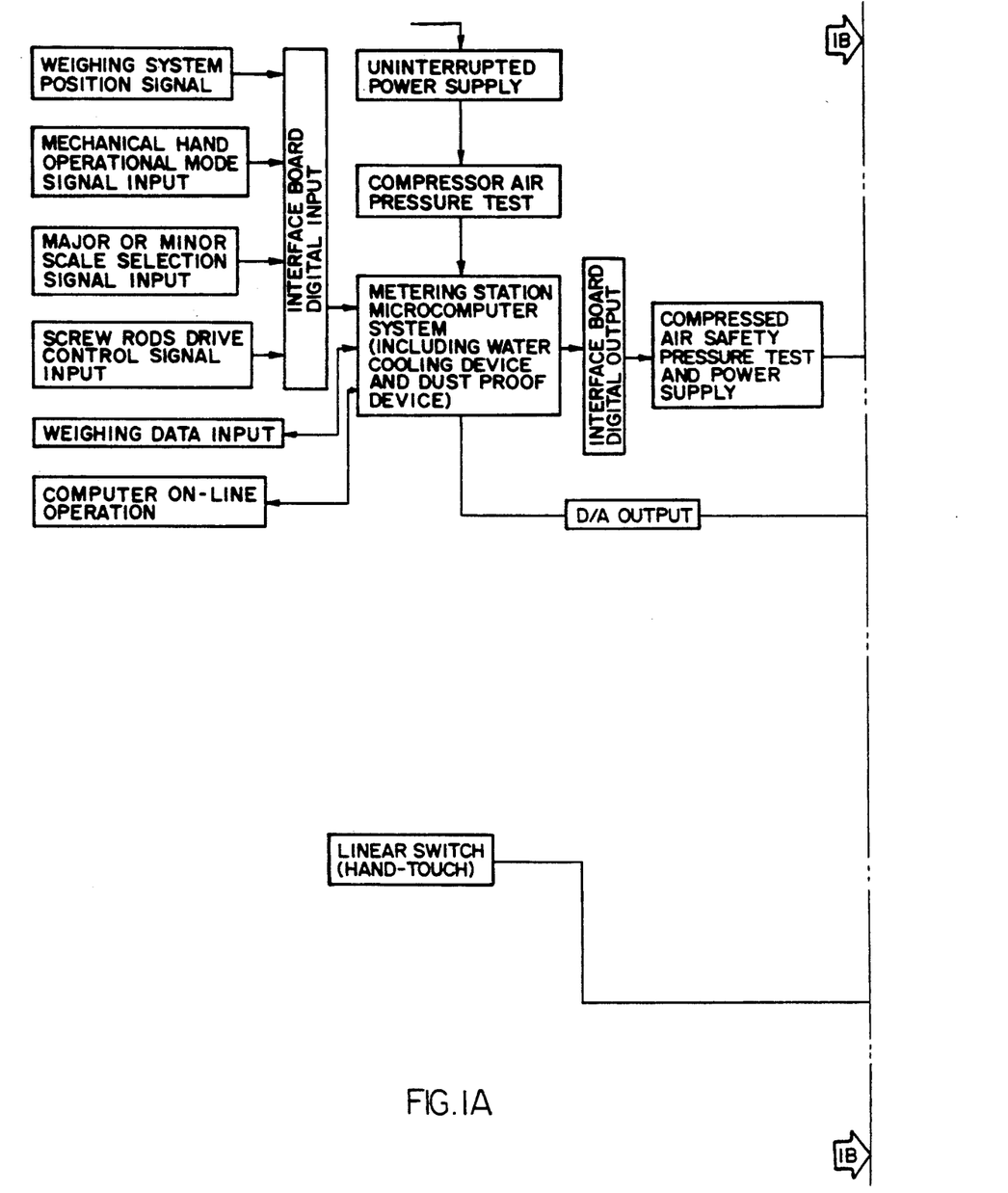
FIGS. 1A and 1B constitute a block diagram illustrating the system assembly of the present invention.
Figure 1B:
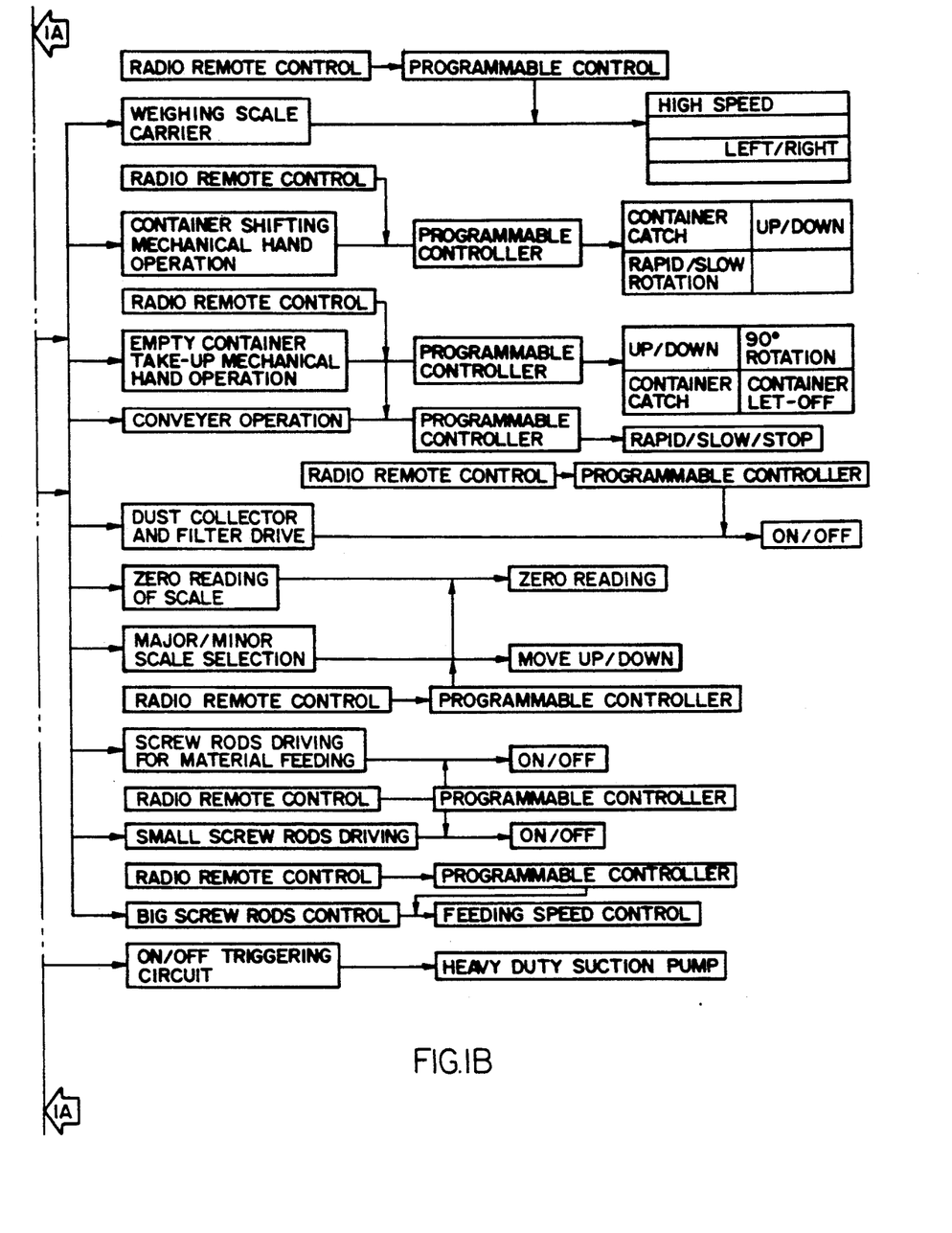

Referring to the annexed drawings in greater detail, an automatic metering and dispensing system in accordance with the present invention is generally comprised of a material suck-in and storage system 1, a feeding system 2, an empty container take-up and let-off system 3, a container shifting and weighing system 4, a conveyer system 5, a metering control microcomputer system 6, an electric engineering control unit 7, a dispensing and inventory operation microcomputer system 8, and a radio remote control system 9.

The material suck-in and storage system 1 includes a closed chamber divided by a plurality of closed partitions each equipped with a heavy-duty suction pump or the like to suck grain cargo through a wire gauze filter and a filter cleaner into the storage tank of each closed partition thereof for storage.

The feeding system 2 includes a transmission device comprised of a variety of screw rods and controlled by a CPU to drive the spiral impellers, which are respectively set in the storage tank of each closed partition of closed chamber of the cargo suction and storage system, to send material out of an outlet for feeding in containers.

The empty container take-up and let-off system 3 is generally comprised of a programmable mechanical hand set by one side of the cargo suction and storage system and controlled by a CPU to take up empty containers and place them on a conveyer system for further dispensing operation.

The container shifting and weighing system 4 includes a programmable weighing system and a mechanical hand. When an empty container is placed on the feeding system 2, the feeding system starts to feed and weigh a first item of material. As soon as a pre-setting weight is measured, the container is shifted to a next outlet to receive another prescribed item of material. After the feeding of last item of material of a predetermined formula is completed and measured, the mechanical hand simultaneously takes up the filled container and an empty container and turns round through an angle of 180° so as to further place such an empty container at a material feeding outlet and place the material filled container on the conveyer system.

The conveyer system 5 is controlled by a CPU to deliver empty containers and material filled containers.

Figure 2:
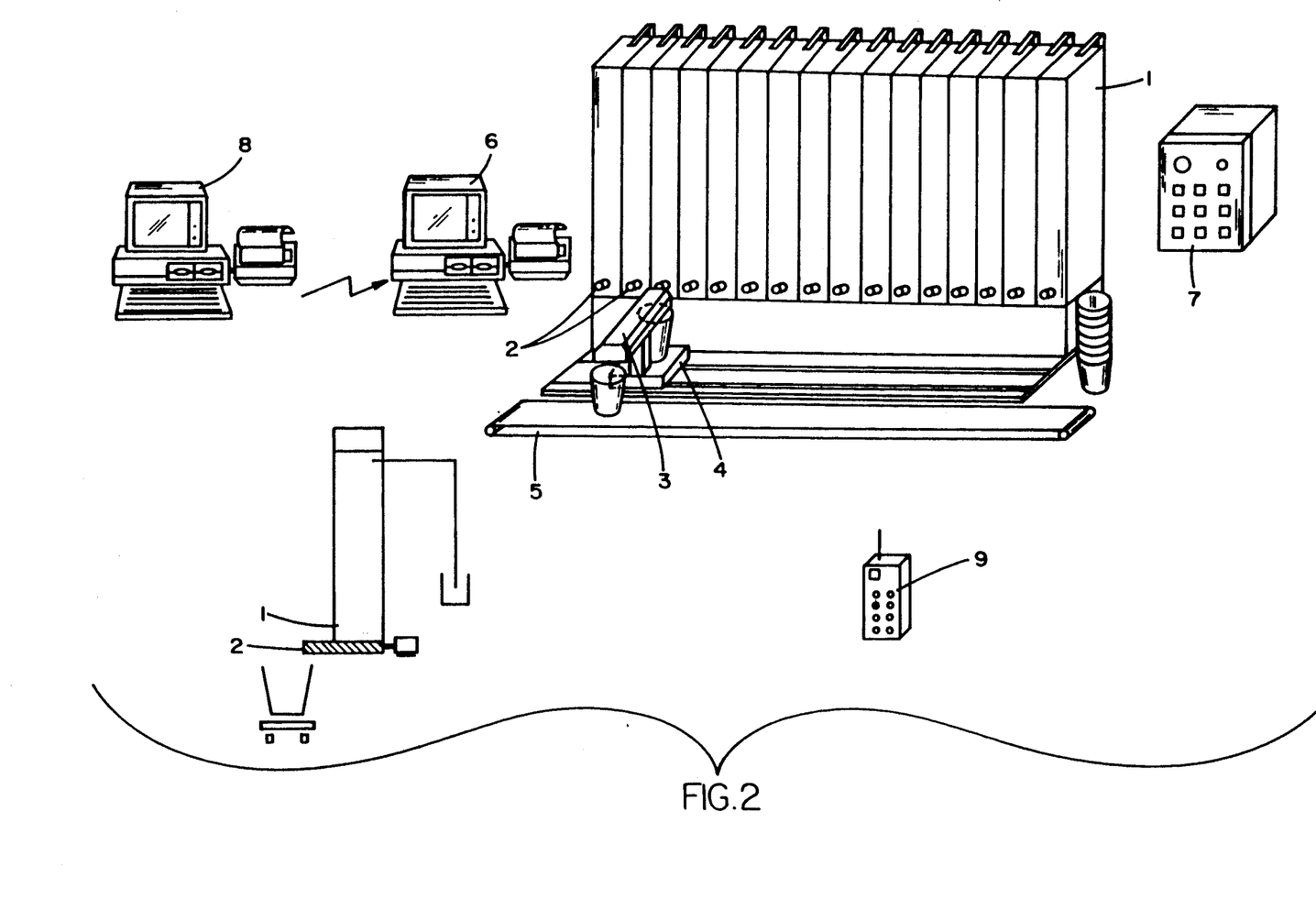
FIG. 2 is a schematic drawing illustrating the hardware arrangement of the present invention.

The metering control computer system 6 is the controlling center of the present invention and is connected with the dispensing and inventory operation microcomputer 8 for on-line operation to control the container shifting and weighing system 4. The metering control CPU 6 can be simultaneously incorporated with other control devices through interface board to control a variety of operations as shown in FIG. 2.

The electric engineering control unit 7 receives instructions from a CPU to start or stop the operation of the conveyer system, the feeding system, the empty container take-up and let-off system and the container shifting and weighing system.

The dispensing and inventory operation microcomputer system 8 is to automatically record prescribed formula and existing inventory for dispensing control, which includes a printer for printing out prescribed formula and existing inventory condition.

The radio remote control system 9 is an auxiliary device to replace the operation of a computer keyboard for instruction input when it is required.

Figure 3:
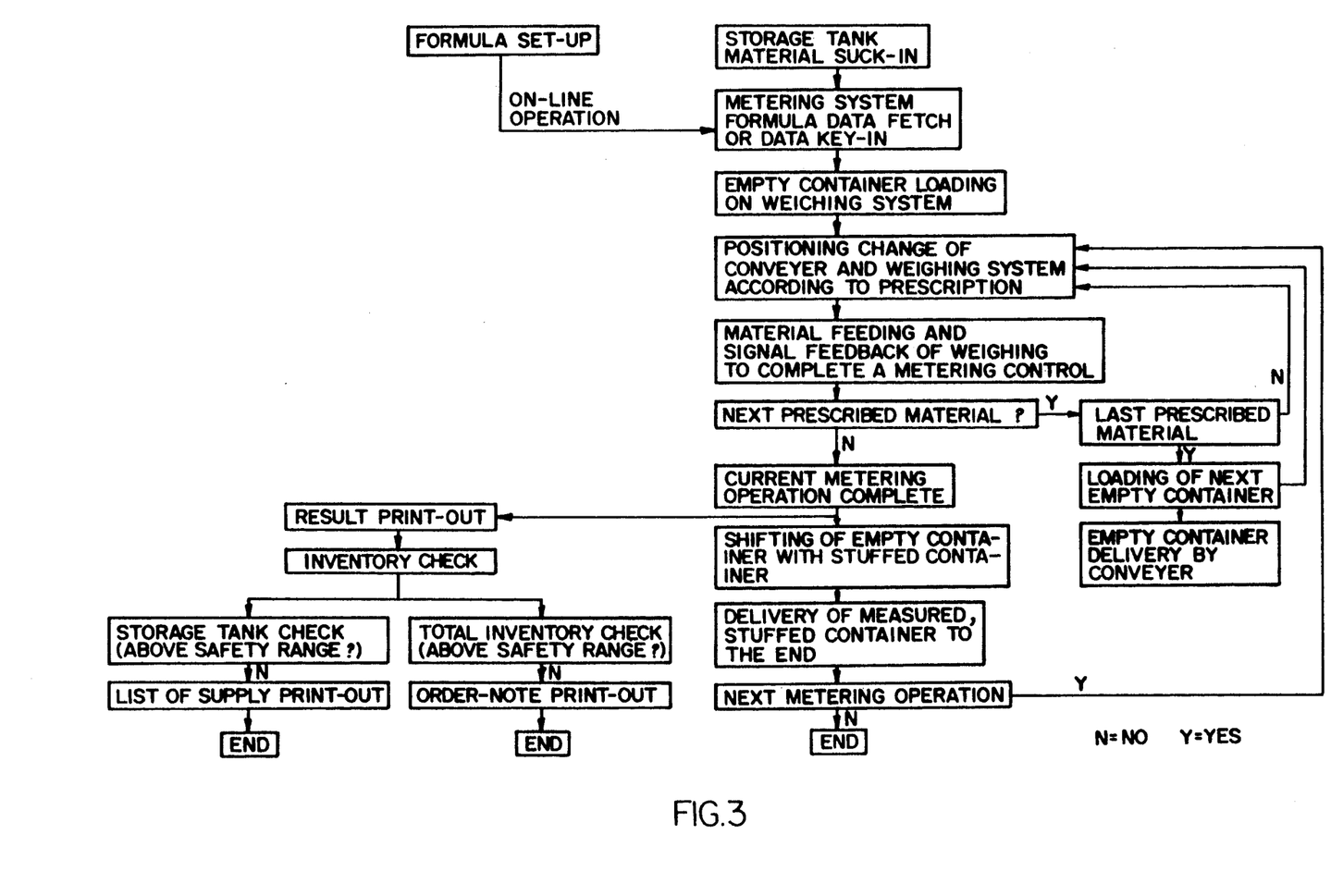
FIG. 3 is an operational flow chart of the present invention.

Referring to FIG. 3, prescribed materials are unpacked and sucked in respective storage tanks of the storage system. A prescribed formula is sent from the CPU of the dispensing and inventory operation computer system 8 to the CPU of the metering control computer system 6 (the data of the prescribed formula may be directly keyed in the CPU of the metering control computer system). When the operation starts, an empty container is picked up by the empty container take-up and let-off system and placed on the conveyer system for delivery to the container shifting and weighing system 4 where the mechanical hand puts the empty container to a weighing scale to receive the feeding of the material of the first item of a prescribed formula. As soon as the feeding of the material of the first item of the prescribed formula reaches a pre-determined amount, it is automatically stopped immediately and moved to a next material feeding outlet to receive the feeding of a next item of material according to programmed instruction. During operation, the data of each weighing procedure is fed back to the CPU of the metering control microcomputer system for registration. As soon as all items of the prescribed formula are completely dispensed, the mechanical hand of the container shifting and weighing system takes up the filled container and another empty container on the conveyer system and turns round through an angle of 180° for shifting by placing the empty container on the weighing scale and the filled container on the conveyer system. When the filled container is carried by the conveyer system to pass through the dispensing and inventory operation microcomputer system, the dispensing and inventory operation microcomputer system automatically renews its storage data and simultaneously provides a print-out of the related data for the filled container to facilitate further processing. At the same time, the empty container on the weighing scale follows a programmed route to receive the feeding of materials according to the prescribed formula. The aforesaid procedure is repeated again and again until the dispensing operation is completed.

Figures 4A, 4B:
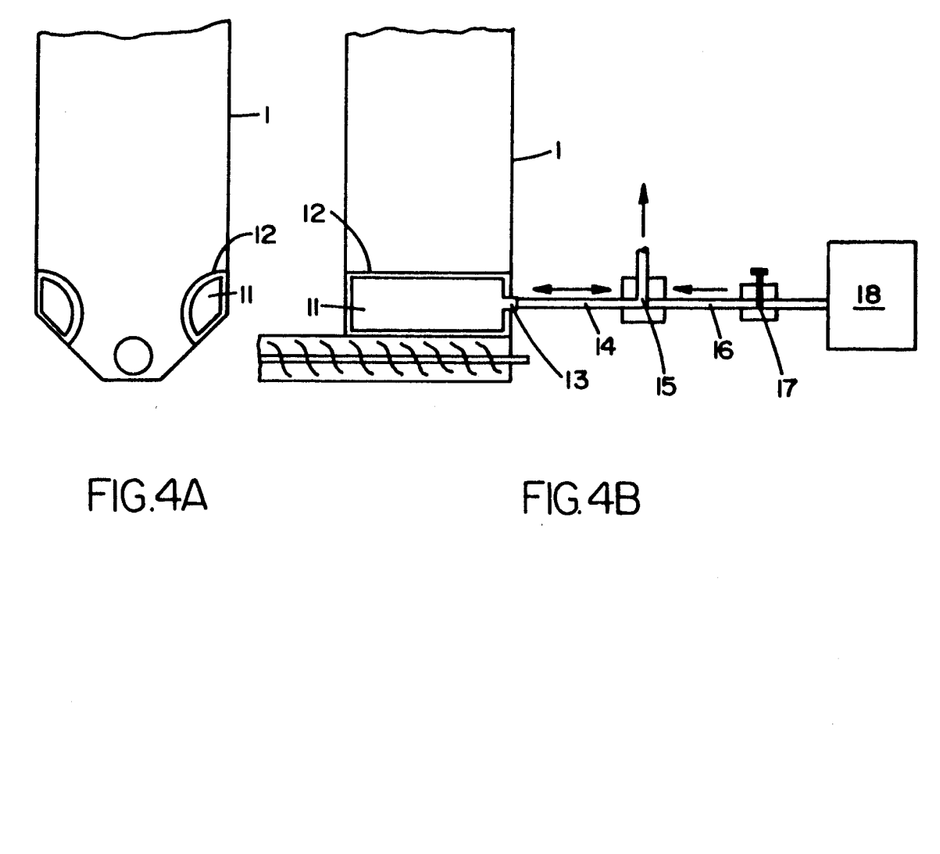
FIGS. 4A and 4B are sectional drawings illustrating the operation of the supply of material of the storage of the present invention.

In order to eliminate rat holing or bridging problem, an air sack 11 may be set at the bottom and closely in contact with the inner wall surface of each storage tank of the material suck-in and storage system 1. The air sack 11 is covered with a layer of soft plastic sheet 12 to prevent from adherence of material thereto, and has an air hole 13 coupled with an air pipe 14 extending outward for filling therein or discharging therefrom of air. The air pipe 14 is coupled with a triple solenoid valve 15 so that compressed air can be directly compressed through an air inlet hole 16 to inflate the air sack 11, and exhausted air can be sent through the triple solenoid valve 15 for exhaust through another branch pipe to prevent from exhaust in the air inlet hole 16. A throttle valve 17 is mounted on the air inlet hole 16 to automatically regulate the flow fate of compressed air according to the gravity and density of the stored grained material. A conventional air compressor 18 is connected to the throttle valve 17 to provide compressed air. On the storage tank 19, there is a material feeding outlet at the bottom.

Therefore, when material is stored in the storage tank, the load on the air sack 11 forces its inner air to flow from the air hole 13 and the air pipe 14 through the triple solenoid valve 15 for further exhaust through a branch pipe. Under this condition, the air sack is flattened out.

During dispensing operation, the triple solenoid valve 15 is intermittently switched on and off permitting compressed air to flow in or out of the air sack 11 through the air pipe 14 so as to inflate or shrink the air sack 11. During the expansion and shrinking operation of the air sack 11, the supported grained material is simultaneously shacked to damage any possible rat holing and bridging so that material condensing problem can be eliminated and material feeding process can be smoothed performed.

Figure 5:
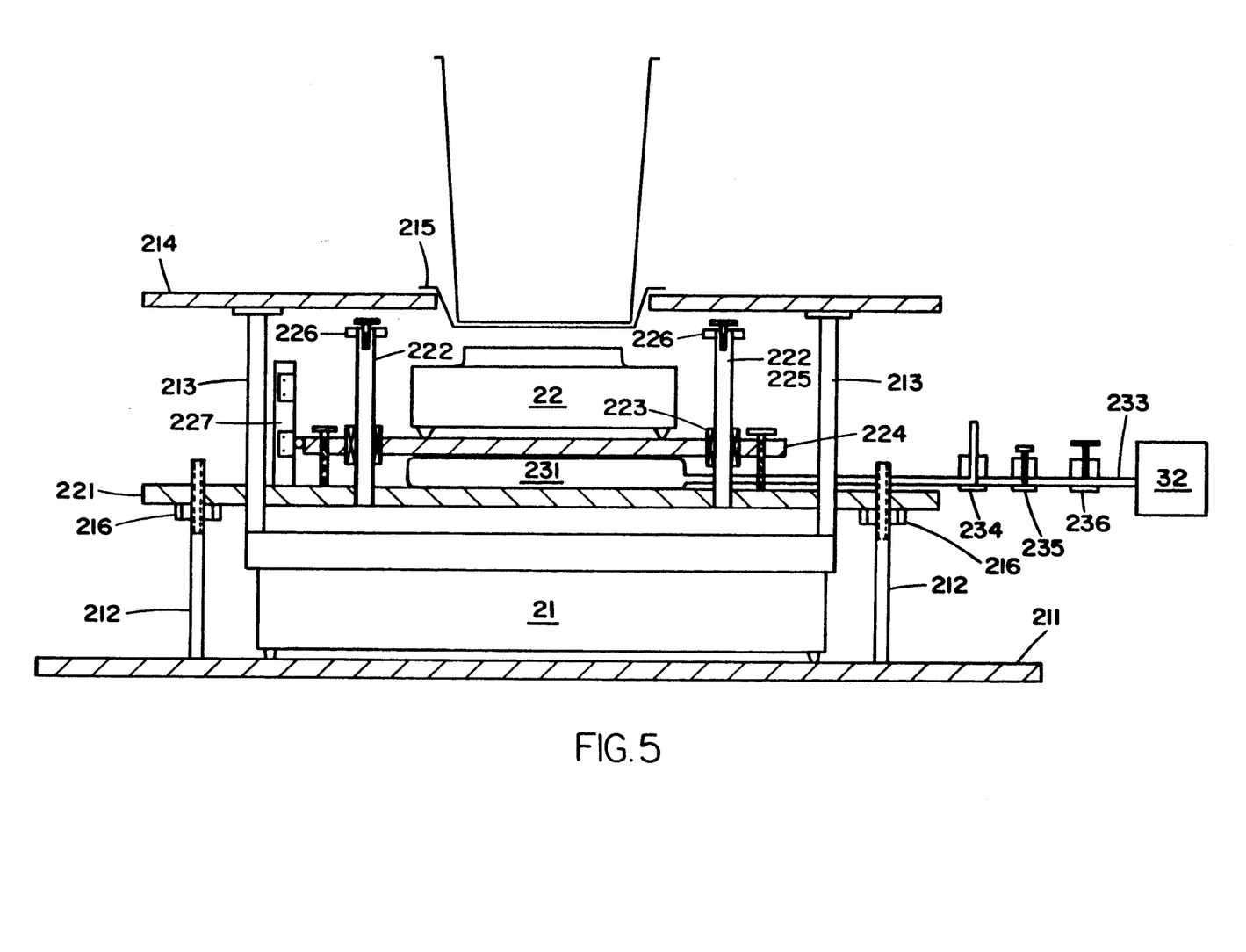
FIG. 5 is a schematic drawing illustrating the structure of the weighing machine of the present invention.
Figure 6:
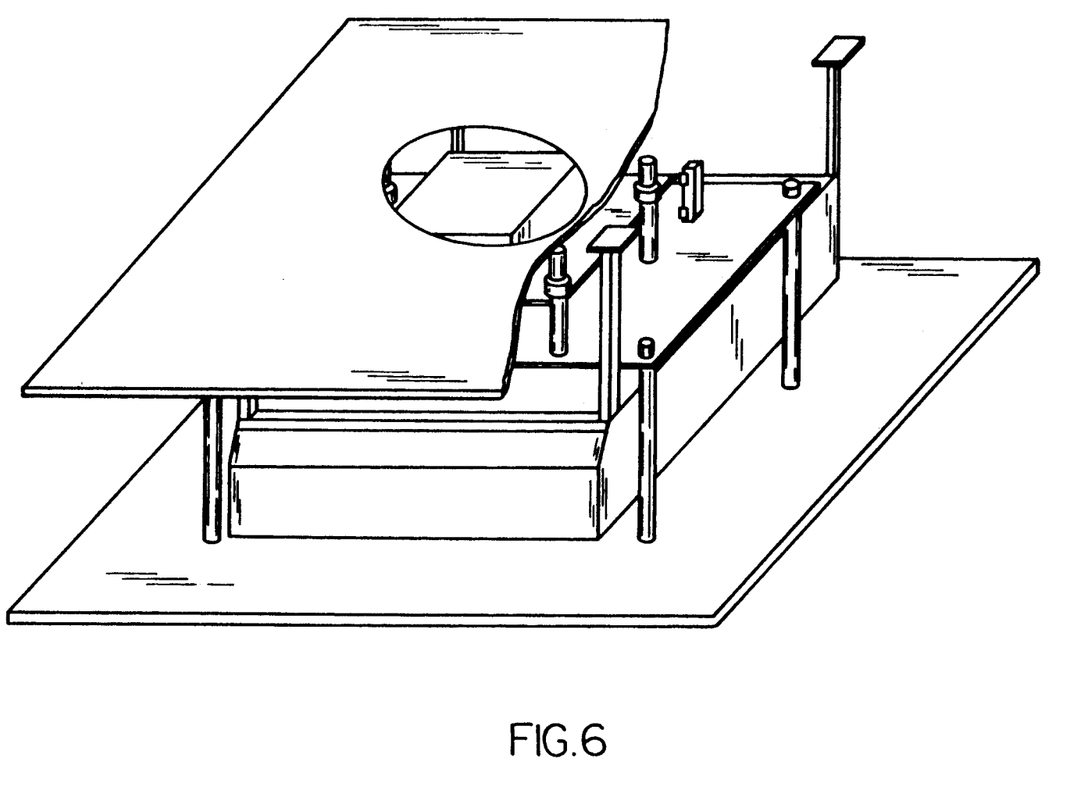
FIG. 6 is a perspective view of the weighing machine of the present invention.

The weighing system of the present invention includes a major scale and a minor scale to fit different weighing range. As illustrated in FIG. 5, the weighing system is generally comprised of a major scale 21, a minor scale 22 and a lifting device 23. The weighing unit for the major and minor scales 21, 22 can be respectively set according to actual requirement. For example, in the present preferred embodiment, it is set 50 kg for the major scale 21 and 1 kg for the minor scale 22. It is most preferable that the scales 21, 22 are of electronic type with LCD for display. The major scale 21 is mounted on a base 211 which includes a plurality of leveling rods 212 vertically mounted thereon for supporting the minor scale 22. The major scale 21 has a plurality of supports 213 on the top to support a leveling block 214 so that any load is placed on such a leveling block 214 the major scale 21 immediately displays its weight. Another leveling block 221 is mounted on the the leveling rods 212. The level and altitude of the leveling block 221 on the leveling rods 212 are adjusted by adjusting nuts 216. Several guide posts 222 are vertically made on the leveling block 221 to guide the lifting of the minor scale 22. The guide posts 222 are each mounted with a linear bearing 223 which extends from a lifting platform 224 which supports the minor scale 22, i.e. the minor scale 22 is placed on the lifting platform 224 to follow the lifting platform 224 to move upward or downward. Several stop rods 225 are mounted on the lifting platform 224 at both sides to confine the down stroke range of the lifting platform 224. A stop plate 226 each is mounted on the top of each guide post 222 to confine the up stroke range of the lifting platform 224. An air sack 231 is set between the minor scale 22 and the leveling block 221 which is one element of the lifting device 23. The lifting device 23 includes a conventional air compressor 232 to produce compressed air to inflate the air sack 231 via an air pipe 233 which is equipped with a triple solenoid valve 234, a throttle valve 235 and a pressure reducing valve 236. By means of the operation of the air compressor 232, compressed air is directly delivered to inflate the air sack 231. During exhausting, the air from the air sack 231 is exhausted through the triple solenoid valve 234.

When the major scale 21 is used, as illustrated in FIG. 5, a load is placed on the leveling block 214 and the total weight of such a load is directly shown through the LCD screen of the major scale 21. Under this situation, the air sack 231 is quite exhausted.

When the minor scale 22 is used, the air compressor 232 and the triple solenoid valve 234 are turned on to inflate the air sack 231 so as to lift the lifting platform 224. When the lifting platform 224 is moved upward, the linear bearings 223 are simultaneously carried to move upward along the guide posts 222, and a detecting device 227 detects such a motion. As soon as the minor scale 22 is lifted by the lifting platform 224 to a predetermined level, the detecting device 227 immediately stops the movement of the lifting platform 224. Thus, a weighing tray 215 is placed on the minor scale 22 above and away from the leveling block 214 for measuring a load through the minor scale 22.

When the major scale 21 is to be used again, the compressed air in the air sack 231 is exhausted through the triple solenoid valve 234 permitting the minor scale 22 to follow the lifting block 224 to descend and receive beneath the leveling block 214 for the major scale 21 so as to not interfere the weighing operation of the major scale 21.

As indicated, the present invention may be variously embodied. Recognizing that various modifications been apparent, the scope herein shall be deemed as defined in the claims set forth hereinafter.

I claim:

1. A grain cargo automatic metering and dispensing system, including:
   - a material suck-in and storage system including a plurality of closed independent storage tanks each equipped with a heavy-duty suction pump for taking up grained or powdered material for storage therein;
   - a feeding system comprised of a variety of computer-controlled screw rods to respectively send the grained or powdered materials out of said storage tanks for dispensing;
   - a conveyer system being computer-controlled to deliver empty containers and material stuffed containers;
   - an empty container take-up and let-off system comprising a computer-controlled mechanical hand to take up and place empty containers on said conveyer system;
   - a container shifting and weighing system comprising a programmable weighing system and a mechanical hand, said mechanical hand being capable of rotating on its own axis through an angle of 180° so as to simultaneously take up a material stuffed container and an empty container for shifting, permitting said empty container to be placed on said weighing system and said material stuffed container to be placed on said conveyer system;
   - a dispensing and inventory operation microcomputer system for the registration of prescribed formula and inventory data, having a printer for printing out the data stored therein;
   - a metering control microcomputer system connected with said dispensing and inventory operation microcomputer system for on-line operation to fetch the data therefrom so as to control the operation of said mechanical hand and said weighing system;
   - an electric engineering control unit controlled by said metering control microcomputer system to start, control and stop all operations of the system;
   - a radio remote control system being an auxiliary signal input device to replace the key-in operation of the keyboards of the microcomputers of said metering control microcomputer system and said dispensing and inventory operation microcomputer system.

2. A grain cargo automatic metering and dispensing system as claimed in claim 1, wherein a rat holing and bridging destruction device each is provided in the storage tanks of said material suck-in and storage system to damage any possible rat holing and bridging, which comprises an air sack set at the bottom and closely in contact with the inner wall surface of the corresponding storage tank and having an air inlet/outlet hole coupled with an air pipe extending out of said corresponding storage tank for connection to an air compressor through a triple solenoid valve and a throttle valve permitting said air sack to be intermittently inflated and shrunk.

3. A grain cargo automatic metering and dispensing system as claimed in claim 2, wherein said rat holing and bridging destruction device includes a plurality of air sacks respectively set in the storage tanks of said material suck-in and storage system and commonly connected to an air pipe for connection to an external air compressor.

4. A grain cargo automatic metering and dispensing system as claimed in claim 2, wherein the air sack of said rat holing and bridging destruction system is set in a corresponding storage tank to cover over the inner wall surface thereof.

5. A grain cargo automatic metering and dispensing system as claimed in claim 1, wherein said weighing system includes:
   - a major scale mounted on a base and having a plurality of supports on the top to support an upper leveling block for loading, said base having a plurality of leveling rods upstanding therefrom to support a lower leveling block, said lower leveling block comprising a plurality of guide posts to support a lifting platform, said guide posts being each coupled with a linear bearing extending from said lifting platform;
   - a minor scale mounted on said lifting platform to follow said lifting platform to move up and down along said guide posts, said minor scale having a weighing tray on the top; and
   - a lifting device comprising an air compressor connected to an air sack via an air pipe, said air pipe being coupled with a triple solenoid valve, a throttle valve and a pressure reducing valve, said air sack being set between said lower leveling block and and said lifting platform;
   - wherein said air sack is inflated by said air compressor to lift said lifting platform and said minor scale for weight measuring performance through said minor scale; said air sack is exhausted to descend said lifting platform and said minor scale for weight measuring performance through said major scale.

6. A grain cargo automatic metering and dispensing system as claimed in claim 5, wherein a detecting device is mounted on said lower leveling block to control the level positioning of said lifting platform and said minor scale.

7. A grain cargo automatic metering and dispensing system as claimed in claim 5, wherein a plurality of stop rods are mounted on said lifting platform at both sides and a stop plate each is mounted on the top of said guide posts to respectively confine the down and up stroke limit of said lifting platform so as to confine the vertical moving range of said minor scale.

* * * * *